UNITED STATES PATENT OFFICE.

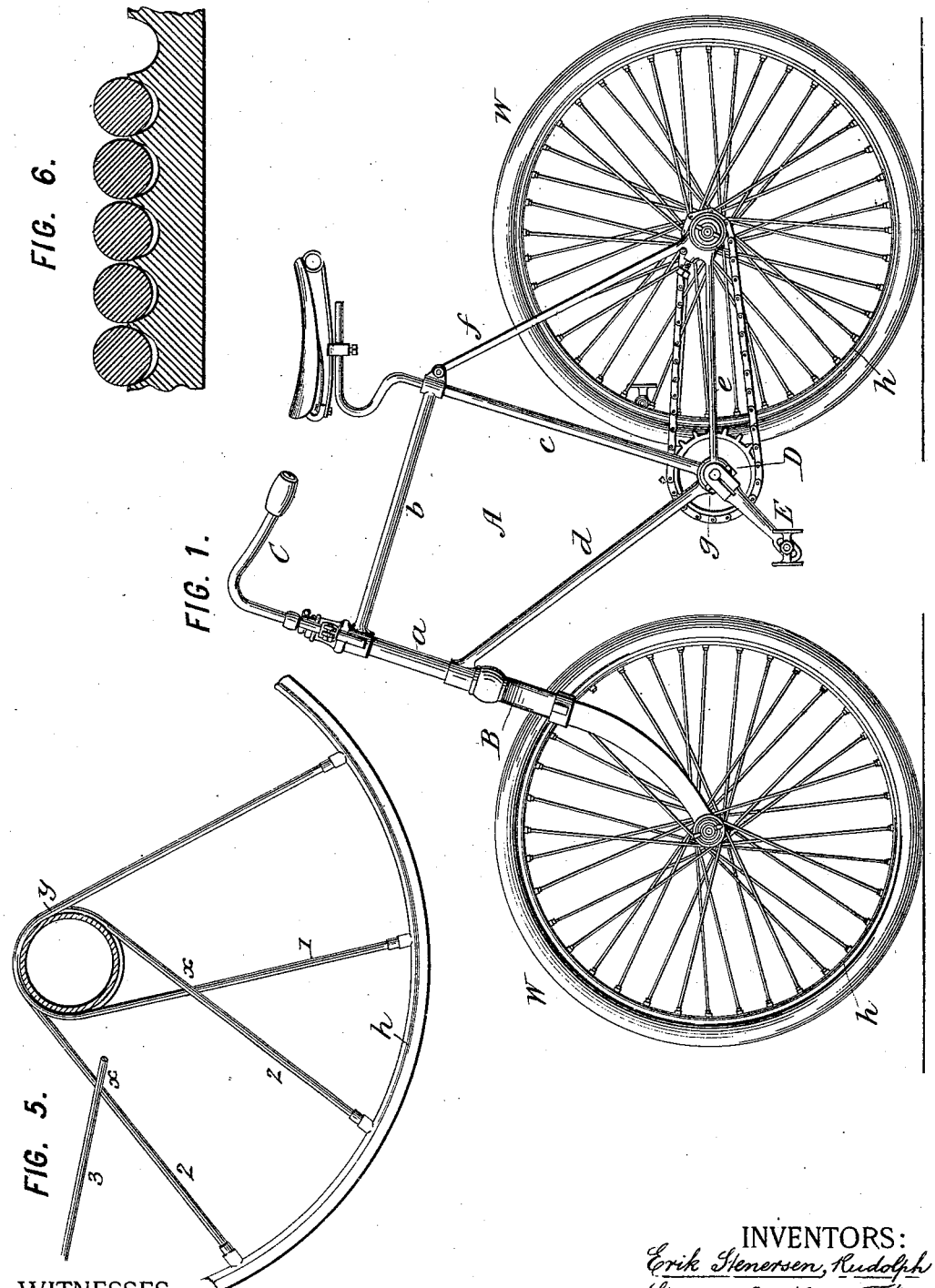

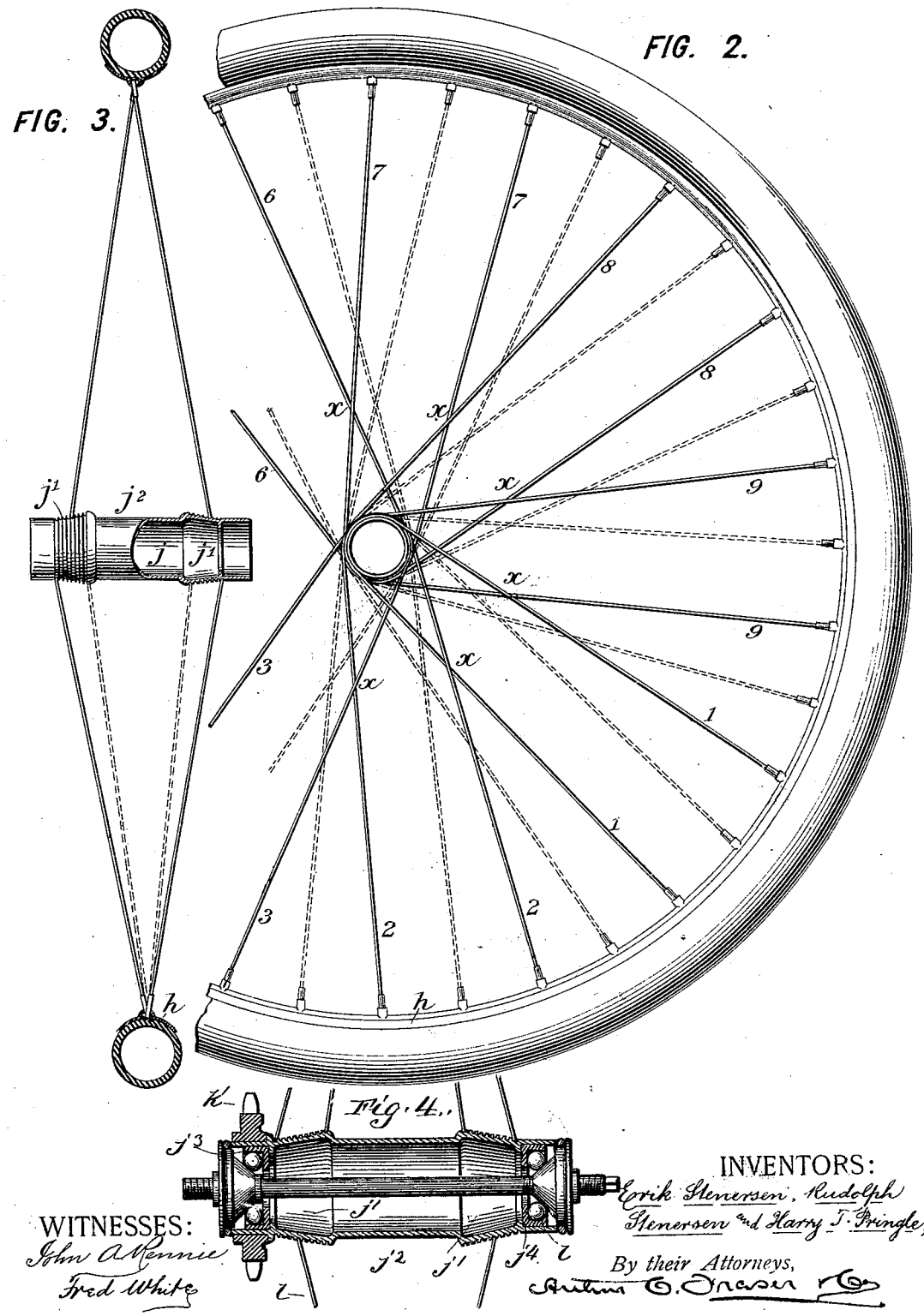
(No Model.) 2 Sheets—Sheet 2
E. & R. STENERSEN & H. T. PRINGLE.
BICYCLE WHEEL.
No. 512,453. Patented Jan. 9, 1894.

ERIK STENERSEN, RUDOLPH STENERSEN, AND HARRY T. PRINGLE, OF BROOKLYN, NEW YORK; SAID RUDOLPH STENERSEN ASSIGNOR TO SAID ERIK STENERSEN; SAID ERIK STENERSEN AND SAID PRINGLE ASSIGNORS OF ONE-THIRD TO THOMAS G. PRINGLE, OF SAME PLACE.

BICYCLE-WHEEL.

SPECIFICATION forming part of Letters Patent No. 512,453, dated January 9, 1894.

Application filed March 10, 1893. Serial No. 465,461. (No model.)

*To all whom it may concern:*

Be it known that we, ERIK STENERSEN and RUDOLPH STENERSEN, subjects of the King of Norway and Sweden, and HARRY T. PRINGLE, a citizen of the United States, residing in Brooklyn, in the county of Kings and State of New York, have invented certain new and useful Improvements in Suspension-Wheels, of which the following is a specification.

This invention relates to improvements in suspension wheels for bicycles and analogous vehicles as tricycles and quadricycles.

We have shown the preferred form of our invention in the accompanying drawings, wherein—

Figure 1 is a side elevation on a small scale of a safety bicycle constructed according to our invention. Fig. 2 is a fragmentary side elevation of one of the suspension wheels. Fig. 3 is a diametrical section thereof. Fig. 4 is a similar section of the hub of the rear wheel. Fig. 5 is a diagrammatic fragmentary view illustrating the manner of connecting the spokes of the suspension wheels. Fig. 6 is an enlarged fragmentary cross-section through the grooved hub and looped spokes of the wheel.

Referring to Fig. 1, it will be seen that in general construction our improved machine is very similar to the safety bicycles now commonly made. In the construction shown it has a diamond frame A constructed of bars $a$ $b$ $c$ and $d$, a fork $e$ extending to the rear wheel bearings, and brace rods $f$ extending from these bearings to the junction of the rods $b$ $c$. The saddle may be mounted on this diamond frame in any suitable way known in the art. A front bar B, the lower end of which is forked to embrace the front wheel, passes through the tubular bar $a$ of the frame, and to its upper end the handle bars C C are attached. At the junction of the bars $d$ $c$ and fork bars $e$, is formed the tubular housing $g$ of the crank-shaft D, on the ends of which are fixed the cranks E E. The rear wheel is driven by a chain, passing over sprocket wheels on the rear wheel hub and on the crank shaft respectively.

We will describe the construction of the wheels W W. These, as is usual in bicycle construction, are suspension wheels with wire spokes, and both are alike in all essential respects. We prefer however to provide the rear wheel with a greater number of spokes than is necessary for the front wheel, having adopted thirty-six for the front and forty for the rear wheel, although other numbers may be substituted. The wheels may also vary in diameter and proportions. In the drawings we have shown pneumatic tires, but any other kind of tire may be substituted. We have shown the rims $h$ as being formed of metal plate rolled into outwardly concave or channel form to properly embrace and hold the tire, and the rim may be constructed of any of the well known shapes or proportions. The wheel consists of the tire, the rim $h$, the wire spokes $i$ $i$, and the hub $j$. The hub is constructed as a single tube, being of smaller diameter than has been customary at the point of engagement with the spokes, and of larger diameter than has been customary in the neck or middle portion between the spokes. The spokes are constructed with their middle portions looped or doubled to pass around the hub, and the hub is constructed with parallel grooves in which the looped portions of the spokes may rest, and whereby they are held in proper positions where they engage the hub. Each spoke or pair of spokes consists of a single length of wire bent or looped at its middle portion in a curve conforming to the diameter of the hub, and having its ends screwthreaded or otherwise constructed for adjustable attachment to the rim. The construction of the hub is best shown in Fig. 4. It is made of a tube of steel or other metal of a suitable diameter (or a tubular casting), which near the opposite ends is formed with concentric grooves for receiving the looped portions of the spokes. These grooved portions are lettered $j'$ $j'$. Each portion has as many grooves as the total number of spokes in the wheel divided by four. The hub may be of uniform diameter from end to end, and by preference it is somewhat enlarged conically at the portions $j'$, so that the inner grooves, that is, those toward the middle of the hub, have a greater circumference than the outer ones. This is done in order that there need be no difference in the length of wire cut for the spokes, all the spokes being of the same length, notwithstanding that they extend from the rim to grooves at different distances from the middle of the hub, the outer spokes extending the greatest distance from the middle, being carried around in the grooves of smallest circumference, and the degree of coning being such that the successive grooves toward the middle are enough larger in circumference to compensate for the less distance between the points of attachment of the spoke at the rim and its points of engagement with the grooves in the hub. The bent portions of the spokes need not be bent to the exact curve of the grooves, since when the strain is put on the spokes by screwing up their ends, their bent portions will adapt themselves to the exact shape of the grooves, and be drawn down into the grooves so as to have a strong and intimate frictional engagement therewith. The frictional engagement thus attained is so effective that when the wheel is put under proper tension by the tightening up of the spokes, it is impossible to turn the hub independently of the wheel by any strain that could be applied to it in the act of driving the bicycle.

To secure the most effective adhesion between the spokes and hub, the grooves in the hub are made with tapering sides, as shown in Fig. 6, so that as the spokes are tightened they are drawn down into the grooves and caused to fit very tightly thereagainst. The grooves may be thus either V-grooves, or preferably round-bottomed grooves with their bottoms of a diameter less than that of the wire constituting the spokes, so that as the spokes are drawn down the wire is compressed as it sinks into the bottom portion of the grooves.

In Fig. 2 the spokes on the near side of the wheel are shown in full lines, and those on the far or remote side are shown in dotted lines.

In putting the wheel together, we will suppose the first pair of spokes marked 1—1 to be applied to the outside groove. The next pair marked 2—2 is then applied in the second groove, the third pair marked 3—3 applied in the third groove, and so on, until the last pair 9—9 is reached, this being put into the last or inner groove.

In order to most thoroughly and effectively brace the wheel the spokes are interlaced. This is done by carrying the first spoke of pair 2 over the second spoke of pair 1 at their point of intersection marked $x$; the first spoke of pair 3 over the last spoke of pair 2; and so on around the wheel. Thus each pair of spokes is interlaced with its two adjoining neighbors all around the wheel at their crossing points denoted at $x\ x$, with the exception of the first and last spokes of pairs 1 and 9, which do not come into contact with each other, being spaced so far apart that it would be impracticable or undesirable to connect them. The interlacing is best shown in Fig. 5, which is drawn out of proportion in order to clearly show that spoke 2 passes over spoke 1 at $x$ and then under it at $y$ where it enters the second groove, and returning passes under spoke 3 at $x$, so that this spoke 2 is deflected outwardly at one point $x$ and inwardly at the other, bearing at the points $x$ against the spokes 1 and 3 and being braced and supported thereby. This construction renders the wheel very stiff and affords great resistance against any buckling strains.

The novel construction of the hub $j$ is characterized by its being of approximately the same diameter from end to end, instead of being as has heretofore been usual, expanded into two disks at the points of attachment of the spokes, and contracted into a small tubular neck barely larger than the axle between these disks. The enlarged neck $j^2$ imparts great stiffness to the hub, giving it great resistance against torsional and longitudinally compressive strains. This construction also renders the hub of lighter weight for a given strength, since it is made integrally from end to end. The rear or driving wheel hub is made with its end portion beyond the grooved portion $j$, screwthreaded or otherwise strongly united to the sprocket-wheel $k'$, the hub being preferably formed with an external collar at $j^3$ against which the sprocket-wheel is seated. The hubs of both wheels are formed with internal collars or shoulders $j^4$ near the opposite ends, against which are seated the grooved rings $l$ of the ball bearings. These rings are made a tight fit with the ends of the hubs and pressed in tightly against the shoulders $j^4$. They are made in a separate piece from the hub in order to conveniently afford a greater thickness for resisting the thrust of the balls; to admit of more readily constructing them with hardened faces against which the balls may roll; to facilitate the grinding and finishing of the surfaces; and to permit of their ready replacement in case they should become cracked or broken. The ball bearings are otherwise of the usual construction having a series of balls rolling around an adjustable cone, or any other suitable arrangement known in the art in ball bearings.

Our invention is not necessarily limited to the precise details of construction hereinbefore described, but may be modified considerably in structural respects without departing from its essential features.

Those features which are considered essential to our invention are hereinafter defined in the claims.

We claim as our invention the following-defined novel features, substantially as hereinafter specified, namely:

1. A suspension bicycle wheel the hub of which is formed with a plurality of parallel grooves, near its opposite ends and the spokes of which are doubled, with their ends secured to the rim and their looped portions embracing the hub and lying in said grooves.

2. A suspension bicycle wheel having its spokes doubled, with their ends secured to the rim and their looped portions embracing the hub, and its hub formed with circumferential grooves for said loops to rest in, said grooves being formed with tapered sides to closely embrace the spokes as they are drawn into them, and thereby generate a considerable frictional adhesion between the spoke loops and the hubs.

3. A suspension bicycle wheel having its hub formed with circumferential grooves and its spokes doubled with their ends secured to the rim and their looped portions embracing the hub, and lying in said grooves, and the successive spokes interengaging at their crossing points, where they are there mutually drawn out of their normal planes and braced against each other.

4. A suspension bicycle wheel having its hub formed with conical portions near its opposite ends, with their larger ends turned toward the middle, and such conical portions formed with parallel grooves, and its spokes doubled, with their ends secured to the rim and their looped portions embracing the hub, and lying in said grooves, the different spokes being consequently carried from the rim out at their engagement with the hub to different distances from the middle, and the said coning of the grooved parts of the hub being sufficient to approximately compensate for the different distances thus traversed by the spokes, in order that all the spokes may be made of equal length.

5. A suspension bicycle wheel having its hub formed of a metal tube with circumferential grooves near its opposite ends for receiving the looped spokes, and of a diameter between the portions engaging the spokes nearly or quite as great as at said portions, whereby the stiffness of the hub in resisting torsional and compressive strains is increased.

In witness whereof we have hereunto signed our names in the presence of two subscribing witnesses.

ERIK STENERSEN.
RUDOLPH STENERSEN.
HARRY T. PRINGLE.

Witnesses:
JOSEPH DONNELLY,
JAMES MULLIN.